United States Patent
Lendl

[11] Patent Number: 6,038,983
[45] Date of Patent: Mar. 21, 2000

[54] TABLE ARRANGEMENT FOR MOTOR VEHICLES

[76] Inventor: Wilhelm Lendl, Forststrasse 18, D-73666 Baltmannsweiler, Germany

[21] Appl. No.: 08/849,829

[22] PCT Filed: Dec. 11, 1995

[86] PCT No.: PCT/DE95/01773

§ 371 Date: Aug. 25, 1997

§ 102(e) Date: Aug. 25, 1997

[87] PCT Pub. No.: WO96/18520

PCT Pub. Date: Jun. 20, 1996

[30] Foreign Application Priority Data

Dec. 13, 1994 [DE] Germany ............................. 44 44 329

[51] Int. Cl.$^7$ .................................................. A47B 23/00
[52] U.S. Cl. ............................ 108/44; 224/276; 248/454
[58] Field of Search ................................. 108/42, 44, 45, 108/134, 135, 152, 6, 9, 25, 26; 224/277, 276, 483; 312/231, 233; 248/454

[56] References Cited

U.S. PATENT DOCUMENTS

| | | | |
|---|---|---|---|
| 1,977,507 | 10/1934 | Edwards | 224/277 X |
| 2,514,014 | 7/1950 | Strumbos | 224/276 |
| 3,074,745 | 1/1963 | Burckhalter | 108/44 |
| 3,239,297 | 3/1966 | Bosko et al. | 312/231 |
| 3,643,606 | 2/1972 | Vise | 108/44 |
| 4,453,788 | 6/1984 | Russell | 108/44 X |
| 4,890,559 | 1/1990 | Martin | 108/44 |
| 5,413,035 | 5/1995 | Fernandez | 108/25 X |

FOREIGN PATENT DOCUMENTS

| | | | |
|---|---|---|---|
| 794697 | 5/1973 | Belgium . | |
| 885350 | 11/1971 | Canada | 108/44 |
| 2218624 | 11/1989 | United Kingdom | 108/44 |

*Primary Examiner*—Janet M. Wilkens
*Attorney, Agent, or Firm*—Edwin E. Greigg; Ronald E. Greigg

[57] ABSTRACT

A table arrangement for mounting on the steering wheel of a motor vehicle having a table top and a container-shaped bottom part, as well as an adjusting device for determining the angular position of the table top in relation to the bottom part. The table arrangement may be hooked on the steering wheel by an anchoring device that allows the table to slide towards the driver.

1 Claim, 2 Drawing Sheets

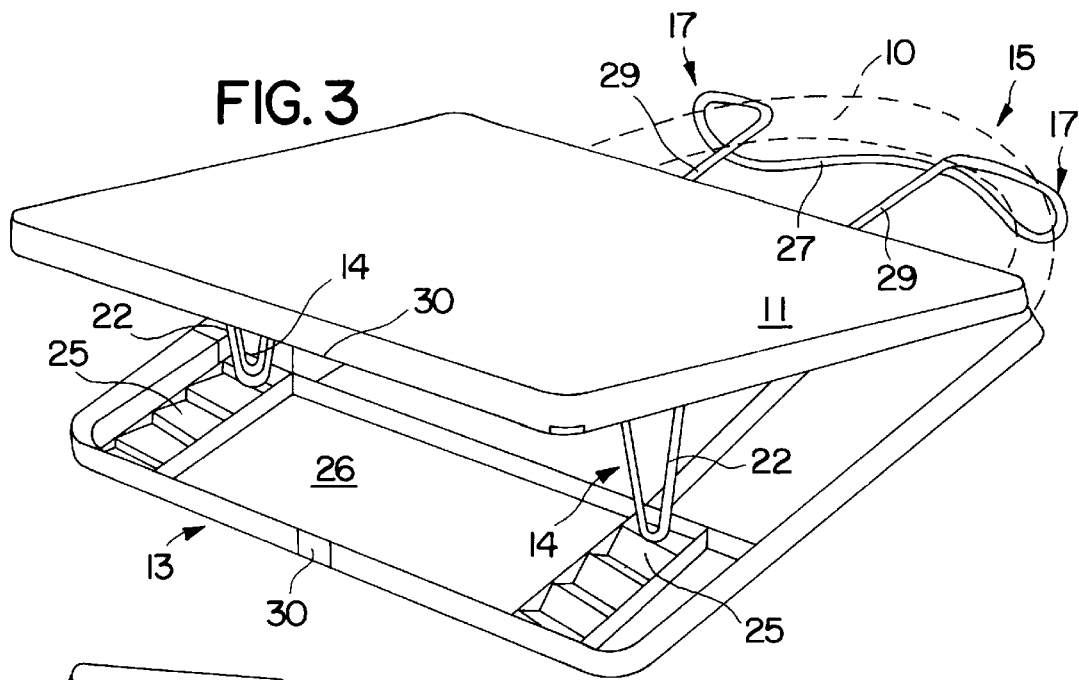
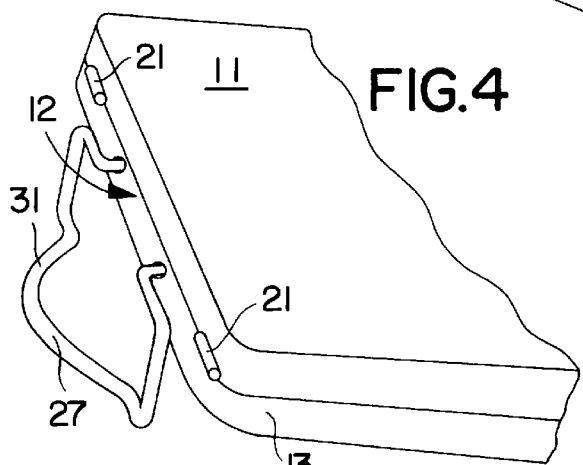
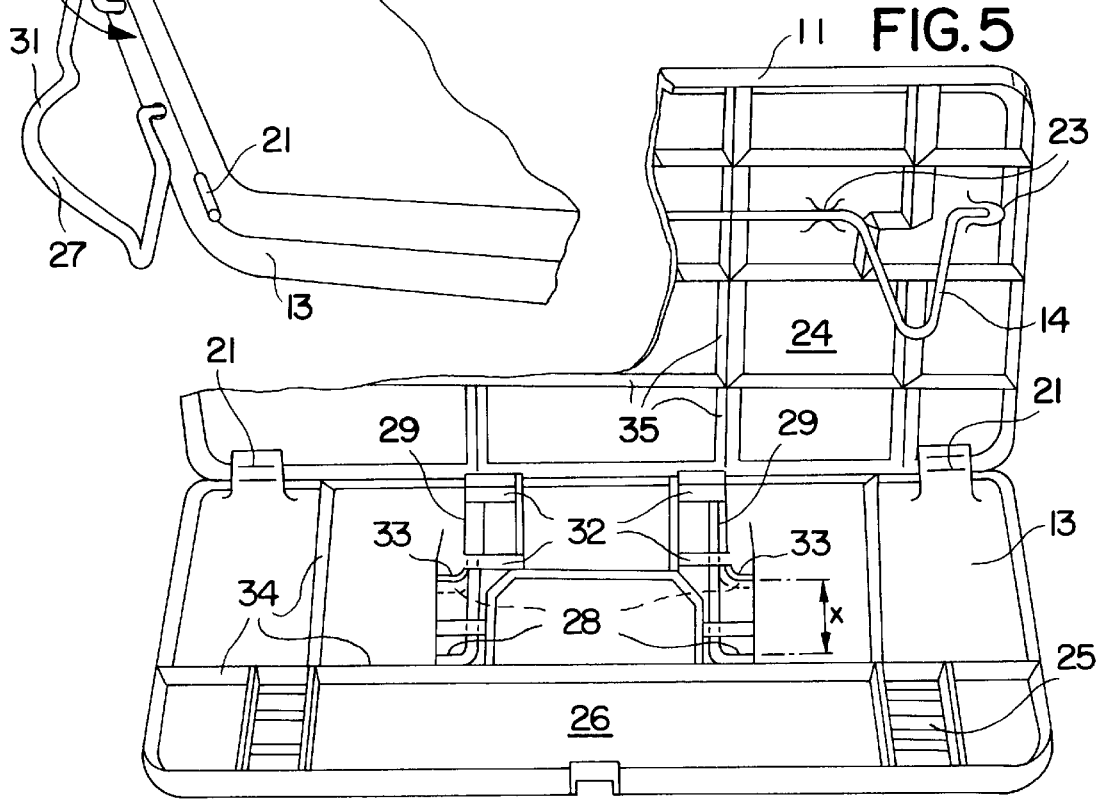

TABLE ARRANGEMENT FOR MOTOR VEHICLES

PRIOR ART

The invention is related to a table arrangement as for motor vehicles. Such table arrangements are put into operation particularly while a vehicle is stopped. Such table arrangements are used both as a tray for a meal, to hold plates, silverware and the like, or as a desktop on which one can write.

In a known table arrangement of this generic type (British Patent Application GB 2218 624), the lower part of the table is placed on the steering wheel of the motor vehicle, and protrusions are provided on the side toward the steering wheel of the lower part, which prevent the table arrangement from slipping toward the driver, given the oblique position of the steering wheel. The pivoted position of the table top is determined by oblong-slotted tabs, which are disposed laterally on the table top, and can be tightened via tightening screws, on which the tabs are guided by their oblong slot, in order to determine the angular position. On the side toward the driver, a strip is provided on the table top, by which the literature that can be placed on the table top is prevented from slipping away. It is not possible to position this table top horizontally. This greatly restricts the range of application, and in particular it is impossible to use as a table to eat on. Moreover, the adjusting device for determining the angular position does not withstand major loads, unless the tightening screw is tightened extraordinarily firmly, which not every driver is capable of without additional tools.

In another known table arrangement of this generic type (U.S. Pat. No. 4,890,559), the lower part comprises a shallow box open at the bottom, which is fitted over the steering wheel. This makes torsionally secured anchoring to the steering wheel almost impossible. However, the table top can be pivoted into a horizontal position. As an adjusting arrangement to determine the angular position, support rods are provided that have rows of holes through which a bar that engages both support rods can be inserted, which to that end can also be inserted through the frame of the lower part. The bar itself is stored on the underside of the table top. Aside from the fact that this is an inconvenient type of adjusting arrangement, as in the other known table arrangement the support is disposed outside the lower part and thus extends into the area of the legs of the driver below the steering wheel. Hence the driver cannot leave the vehicle and enter it without hindrance. Last but not least, it is true of both these known table arrangements that their utility is greatly restricted and they are inconvenient to manipulate.

THE INVENTION AND ITS ADVANTAGES

The table arrangement according to the invention has the advantage over the prior art that such a container can be used in manifold ways. The container can be used to hold both foods and beverages and reading material, so that the driver on leaving the vehicle can carrier the container along with him and fill it and empty it as desired at any other point. The table arrangement thus has an additional purpose, which is of extraordinary significance. The container can be embodied variously, as needed and in accordance with its use. For instance, it can have the form of a suitcase, in which the lid of the suitcase acts as the table top. The container may comprise plastic, wood or metal, or also other materials, such as processed natural substances. Because of the presence of such a container, unwanted persons are prevented from taking notice of things the driver carries with him, whether they are foods and beverages or the like, or important papers, or newspapers or other reading material.

In an advantageous feature of the invention, the anchoring device has hooks or the like, which reach around the steering wheel to engage it on the side remote from the driver. It is known in principle to use hooks (German Utility Model DE-GM 1 867 782). The advantage of such hooks is that because of the wedging action, the table arrangement can clamp firmly to the steering wheel, and thus cannot be rotated except by turning the steering wheel, but the steering wheel is locked when the steering wheel lock drops into place when the ignition key is turned in the off direction. Hooks as an anchoring device also have the advantage of less dependency on the diameter of the steering wheel. A cuff-type ring could also be used as an anchoring device, but such a ring would have to be approximately equivalent in diameter to the steering wheel. Since in terms of its shape the table arrangement is largely independent of the design of the anchoring device, however, only the anchoring device would have to be adapted to the given properties of the steering wheel.

In another advantageous feature of the invention, the anchoring device has a displacement device, by way of which the lower part can be adjusted and/or locked with respect to the steering wheel relative to the driver. The special advantage of this is that when placed on steering wheels the table top can be pulled relatively far toward the driver, depending on the incline of the steering wheel, on the one hand so that the final height of the table top will be suitably low for writing, for instance, and on the other to assure that particularly when eating, the driver can bend over his dish.

In a feature of the invention that is advantageous in this respect, the displacement device has a tongue-in-groove connection disposed parallel to the bottom of the lower part. This may be a connection between a plate belonging to the anchoring device and the bottom of the lower part.

In an alternative feature of the invention advantageous in this respect, the displacement device has a wire hook bent substantially in the shape of a U, whose legs are supported so as to be displaceable or lockable in detent fashion in the displacement direction in the lower part, and whose part joining the legs also serves as a carrying handle and is bent in such a way that it can reach around the steering wheel and engage it. Such a wire hook is embodied resiliently, and in the inserted position it can act as a carrying handle, and the ends of the legs can be bent so as to cooperate with corresponding detent openings on the lower part. Thus it is also possible to provide multiple recesses or gridlike steps in the lower part in the displacement direction, to allow fixing the hook at variously extended positions as needed. Especially in the case where a metal wire hook and a plastic lower part and a circular cross section of the wire hook are combined, the plastic bearings on the lower part can be embodied such that the wire can be pressed or snapped into a bearing of this kind. By the disposition of the legs of the U inside the container, bulky parts protruding outward from the table arrangement are above all avoided.

In another advantageous feature of the invention, the table top and the lower part are joined together by a hinge and can thereby be swiveled relative to one another. In this way, regardless of the particular vehicle type and hence the inclination of the steering wheel, the table top can be adjusted to the desired, largely horizontal position. The hinge is disposed on the side of the table arrangement remote from the driver. This adjustment can be done such that the table top has a certain downward slope toward the driver—in order also to prevent any foods from undesirably reaching the dashboard of the vehicle.

In another feature of the invention advantageous in this respect, a support device that can be inserted between the table top and lower part remote from the hinge acts as the adjusting device for whichever angular position is assumed upon swiveling; in a feature of the invention, the support device may be pivotably supported on the lower part in the direction of the table top, or the support device may be pivotably supported on the underside of the table top in the direction of the lower part. In this way, it is achieved in a very simple way that when the table top is swiveled, the support device is pivoted downward or upward and locks into place on the lower part or under the table top. For pivoting the table top downward, the support device can then be pivoted accordingly or pivoted all the way inward.

In another feature of the invention in this respect, indentations and/or protrusions for securing the pivoted position of the support device are present on the underside of the table top or in the lower part. Especially in the case of a plastic container, it is easy to form such indentations or protrusions integrally during its production. But even with a container made of metal or some other material, inserts are usually provided, in which these desired grids can then be disposed.

In another feature of the invention, the support device comprises a wire hoop. Such a wire hoop occupies little space and is very easy to support by its bent ends, for instance in bores extending crosswise to the pivoting direction, into which the bent ends of the hook are inserted, and are held in that position by the elasticity of the hook.

In another advantageous feature of the invention, partitions (struts) forming compartments are provided in the lower part, facing toward the table part, in order to prevent the contents from becoming jumbled. For instance, individual compartments can be used for silverware, others for foods, and still others for reading matter and the like.

In another advantageous feature of the invention in this respect, the compartments, in the closed state of the container, are closable by the table top or corresponding partitions (struts) disposed on the inside of the table top. This kind of space-enclosing covering can be made waterproof if necessary, for instance by means of an elastic layer on the underside of the table top, and the individual compartments, in the plastic version, can be embodied integrally with the lower plate. For reasons of space and stability, a suitable partition embodiment may also be provided on the underside of the table top.

In another advantageous feature of the invention, the container formed by the lower part and the table top can be locked with a locking device. This makes it simpler to carry any goods whatever around, and on the other hand, access by unwanted persons is prevented.

In another advantageous feature of the invention, the table top has a rectangular surface, preferably with rounded corners and recesses for catching liquids, holding beverage containers, such as drinking cups, bottles, and the like.

The invention is not merely limited to the use of such a table arrangement for motor vehicles in traffic; its use is also conceivable in airplanes, railroad cars, camping cans, and also buses and the like, in each case wherever a steering wheel or suitable support from below is present.

Further advantages and advantageous features of the invention can be learned from the ensuing description, drawings and claims.

BRIEF DESCRIPTION OF THE DRAWINGS

Two exemplary embodiments of the subject of the invention are shown in the drawings and described in further detail below. Shown are:

FIG. 3, the second exemplary embodiment in a perspective view laterally from above;

FIG. 4, a fragmentary outside view thereof; and

FIG. 5, an inside view of the opened table arrangement.

DESCRIPTION OF THE EXEMPLARY EMBODIMENTS

Figure 1:
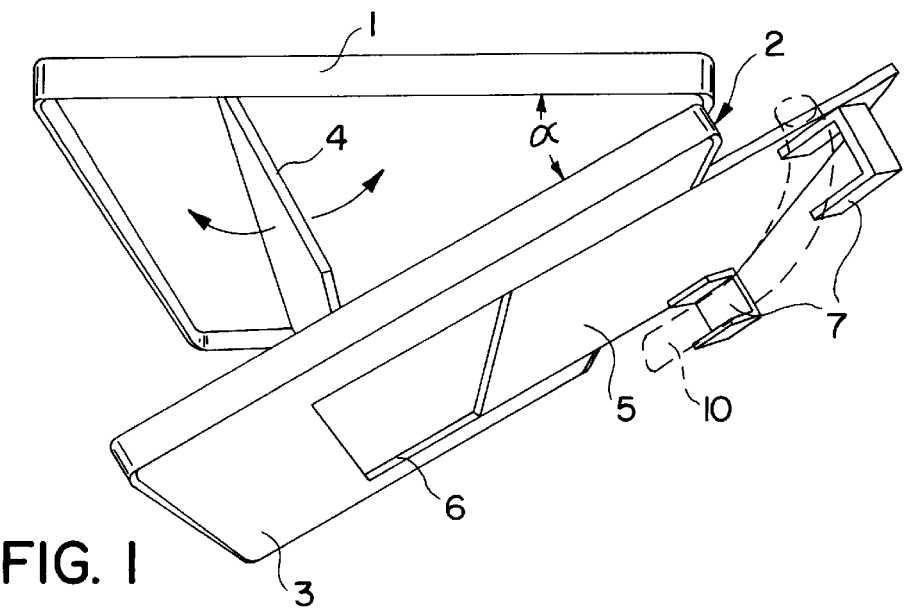
FIG. 1, the first exemplary embodiment, in a perspective view laterally from below.
Figure 2:
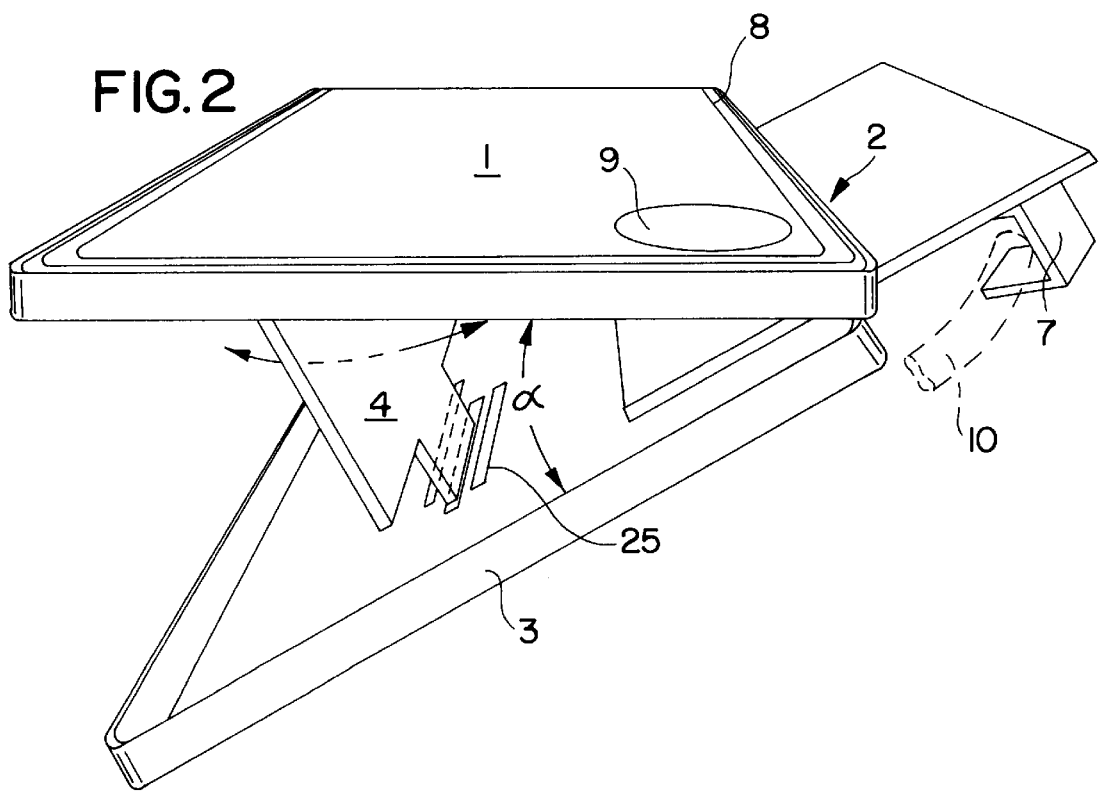
FIG. 2, the same exemplary embodiment in a perspective view laterally from above.

In the first example of the table arrangement of the invention, shown in perspective in FIG. 1 and FIG. 2, a table top 1 acting as a lid is pivotably joined via hinges, not shown, on the face end 2 to a containerlike lower part 3. The underside of the table top 1 and the top side of the lower part 3 are hollow, so that the two parts 1 and 3 fitting on one another form a lid and container. This container can be filled with goods as needed.

The table top 1 can be swiveled open by a certain angle $\alpha$ relative to the lower part 3, so that despite an inclined position of the lower part 3, the table top 1 can be disposed largely horizontally. To enable fixing this angular position $\alpha$, an adjusting device in the form of a support device 4 is disposed between the table top 1 and the lower part 3; via means not shown, represented by an arrow in FIGS. 1 and 2 it is pivotably supported on the underside of the table top 1 and can brace itself, by its end remote from the table top 1, in recesses 25 on the top side of the lower part 3. Depending on the pivoted position of this support device 4, the angular position $\alpha$ of the table top 1 can also vary.

An anchoring device 5 is provided on the underside of the lower part 3; it is connected to the lower part 3 in a slide connection 6 that has a tongue and groove. The relative displaced position between the anchoring device 5 and lower part 3 can be locked by means not shown. Hooks 7 are also disposed on the anchoring device 5 to enable securing the table arrangement to a motor vehicle steering wheel 10, merely suggested in the drawings; the lower part 3 is placed on the steering wheel, and then on displacement toward the driver the hooks 7 hook firmly onto the steering wheel 10. Depending on how far the anchoring device 5 is displaced outward relative to the lower part 3, the entire table arrangement is moved closer to the driver. A groove 8 and a recess 9 are provided on the table top 1, on the one hand if liquids should spill to prevent them from spilling on the driver or the dashboard, and on the other hand to prevent spilling entirely, in that cups or bottles are secured against tipping in a known way.

In the second exemplary embodiment shown in FIGS. 3–5, the parts corresponding to the first exemplary embodiment are provided with the same reference numerals plus 10. The table top 11 is joined to the lower part 13 via hinges 21, which are shown on the face end 12, namely the side of the table arrangement remote from the driver. Wire hooks 22 bent multiple times act here as a support device 14, being pivotably supported in a simple manner in bearings 23 on the underside 24 of the table top 11. The table top 11 and lower part 13 of the table arrangement comprise plastic, so that these bearings 23 can easily be made integrally during the manufacture of the table arrangement. Detent recesses 25 are present in the containerlike lower part 13, and with the table top 11 swiveled open they can be engaged by the ends remote from the table top 11 of the support device 14. These detent devices 25 are embodied by protrusions or indentations of the bottom 26 of the lower part 13. In FIG. 3, the support device is shown pivoted outward and in FIG. 5 pivoted inward, in which latter state it rests on the underside 24.

As the anchoring device 15, a wirelike hook 17 bent multiple times is used here, with which this anchoring device 15 can be hung over the steering wheel 10; the support points relative to the steering wheel 10 are relatively far apart from one another, in order to assure a certain stability of support of the underside 13 on the steering wheel 10. This hook 17 is bent essentially in a U, with two straight legs 29 that have a bend 28 only on the end inside the lower part 13, and with a wire hook 27 joining these legs 29. This wire hook 27 is shaped such that the two legs 29 after emerging from the face end 12 are first bent in opposite directions and are then given a parallel course crosswise to the lower part 13 and are finally joined together via a hook segment 31 that has approximately the same curvature as a steering wheel. As shown in FIG. 5, the legs 29 are supported axially displaceably in bearings 32 above the bottom 26 of the lower part 13; the position of these legs 29 shown in FIG. 5 is equivalent to a position of the anchoring device 15 as shown from outside in FIG. 4. In order to assume the extended position shown in FIG. 3, the legs 29 are displaced by the distance X shown in FIG. 5, after which the bends 28 abut against the stops 33 provided in the bottom part.

Between the table top 11 and the lower part 13, a locking device 30 is provided, to enable locking the container formed by the table top and the lower part.

Struts 34 are disposed in the containerlike lower part 13, and by means of them a kind of compartmentalization of the container is accomplished, to allow separating the articles to be held from one another. Struts 35 are also provided on the underside 24 of the lidlike table top 11, and they can correspond with the struts 34 of the lower part 13 in order thereby to enable covering the individual compartments but also to achieve additional stability.

All the characteristics shown in the description, the ensuing claims and the drawing, may be essential to the invention either individually or in arbitrary combination with one another.

The foregoing relates to preferred exemplary embodiments of the invention, it being understood that other variants and embodiments thereof are possible within the spirit and scope of the invention, the latter being defined by the appended claims.

List of Reference Numerals
1 table top
2 face end
3 lower part
4 support device
5 anchoring device
6 slide connection
7 hooks
8 groove
9 recess
10 steering wheel
11 table top
12 face end
13 lower part
14 support device
15 anchoring device
17 hooks
21 hinge
22 wire hoop
23 bearing
24 underside of 11
25 grid arrangement
26 bottom
27 wire hoop
28 bend
29 leg
30 locking device
31 hoop portion
32 bearing
33 stops
34 struts
35 struts The invention claimed and desired to be secured by Letters Patent of the United States is:

1. A table arrangement for mounting on a steering wheel of a motor vehicle, which comprises:

a table top (1, 11);

a lower part (3, 13) connected with a table top along one edge by hinges;

a table top support device that is pivotally supported on a lower surface of said table top at a position remote from said hinges which acts as an adjusting device for adjusting said table top relative to the lower part;

indentations or protrusions on an inner surface of said lower part which support an end of said table top support device in a pivoted position for securing said table top at different angles with respect to said lower part;

an anchoring devices, (5, 15) secured to a bottom surface of said lower part for securing said table arrangement to said steering wheel of said vehicle, said anchoring device being secured to said bottom surface of said lower part, via a tongue-in-groove connection for adjustment relative to said bottom surface of said lower part;

said anchoring device including spaced hook means extending therefrom adapted to reach partially around different parts of the steering wheel to engage and secure the table arrangement on a side of said table arrangement remote from a person positioned relative to the steering wheel; and an upper surface of said table top includes at least one recess for catching liquids and holding beverages and other items.

* * * * *